United States Patent [19]

Kelly

[11] Patent Number: 4,663,608

[45] Date of Patent: May 5, 1987

[54] PRESSURE-BIASED, TEMPERATURE SENSOR

[75] Inventor: Robert R. Kelly, Hoffman Estates, Ill.

[73] Assignee: Borg-Warner Corporation, Chicago, Ill.

[21] Appl. No.: 891,800

[22] Filed: Aug. 1, 1986

Related U.S. Application Data

[63] Continuation of Ser. No. 728,736, Apr. 30, 1985, abandoned.

[51] Int. Cl.$^4$ .............................................. B60Q 1/00
[52] U.S. Cl. ..................................... 340/60; 340/611;
340/614; 340/626; 340/59; 73/118.1; 73/708;
73/714; 73/729; 374/203; 374/145; 374/146;
200/83 C; 200/83 D
[58] Field of Search .................. 340/521, 60, 59, 603,
340/588–592, 605, 611, 614, 612, 618, 622, 626;
374/142–146, 203; 73/118, 708, 714, 729;
200/83 R, 83 A, 83 B, 83 C, 83 D, 81 R, DIG. 5

[56] References Cited

U.S. PATENT DOCUMENTS

| 766,820 | 8/1904 | Fulton | 374/203 |
|---|---|---|---|
| 1,815,642 | 7/1931 | Zubaty . | |
| 1,933,453 | 10/1933 | Schlaich . | |
| 2,943,167 | 6/1960 | Hughes et al. | 200/83 D |
| 3,338,099 | 8/1967 | Remick, Jr. et al. | 374/145 |
| 3,439,356 | 4/1969 | Kinzer | 374/143 |
| 3,472,077 | 10/1969 | Bucalo | 200/83 D |
| 3,852,546 | 12/1974 | Maxwell, Jr. et al. | 200/83 C |
| 4,051,728 | 10/1977 | Metz . | |
| 4,237,354 | 12/1980 | Rockenfeller et al. | 73/729 |

Primary Examiner—Donnie L. Crosland
Attorney, Agent, or Firm—John W. Harbst

[57] ABSTRACT

A pressure-biased, temperature sensor means utilizing a cooperating pair of aligned bellows operators in a chamber communicating with a fluid system. One of the bellows expanding in response to an elevated temperature of said fluid and the second bellows expanding in response to a decrease in fluid pressure. Both of the bellows operate to move a diaphragm operator to close a switch means in a signal circuit thereby completing the circuit and energizing a signal means.

5 Claims, 3 Drawing Figures

PRESSURE-BIASED, TEMPERATURE SENSOR

This is a continuation of application Ser. No. 728,736, filed Apr. 30, 1985, now abandoned.

BACKGROUND OF THE INVENTION

1. Field of the Invention

This invention discloses a multiple function sensing means for a fluid system. More specifically, this invention relates to a sensor for a vehicular coolant system. The sensor is a relatively compact structure to monitor under-pressure and over-temperature conditions in a coolant system, and provides a signal means indicative of a malfunction. Coolant can boil away at normal operating temperatures if the system is open, such as with a ruptured hose or a loose radiator cap.

2. Prior Art

Monitoring devices and sensors for fluid systems are known in the art, particularly temperature sensing apparatus for automobile coolant systems. There have been efforts to provide both over pressure and over-temperature sensing devices but not an under-pressure and over-temperature sensor. Indicative of this prior art is U.S. Pat. No. 3,439,356 (Kinzer) which discloses a pressure-temperature sensor. In this apparatus opposed bellows chambers are coupled by a movable electrically conducting disc, which is displaced between a tube end and a thermocouple junction. The disc is moved to contact the thermocouple switch to energize a signal means and thereafter the disc is adjusted with a fluid at a known pressure to disclose an accurate pressure reading. The thermocouple is utilized in a known fashion to yield the temperature of a surrounding fluid.

U.S. Pat. No. 1,933,453 (Schlaich) teaches an indicating device responsive to both temperature and pressure. However, this device requires a coil resistor 13, a temperature coil shown as bimetal coil 16, and a diaphragm operator 24. The diaphragm operator 24 is responsive to an excess pressure to open a circuit. This device provides a current from a battery (not shown) to the end of resistor coil 13 and wiper 14 which is operable by diaphragm 24. The temperature actuation, although reasonably accurate at most temperatures, is inadequate to move the indicator for its entire distance or stroke. However, at an overheated condition sufficient for the liquid to boil vigorously, an excess pressure is present that will actuate the diaphragm to move the indicator for substantially its entire travel range. A drawback noted in this device is, that until vigorous boiling occurs, the thermometer or temperature indicator does not accurately indicate the water temperature due to the difference between the water temperature and air temperature of the space surrounding the temperature responsive instrument.

U.S. Pat. No. 3,338,099 (Remick, Jr., et al) teaches a boiling point indicator which utilizes two sensors, one for pressure and one for temperature. A diaphragm operator moves a mechanical indicator. There is no teaching of an electrical signal provided for such readings. This particular device is operable only as an indicator of a safe-unsafe temperature.

U.S. Pat. No. 4,051,728 (Metz) teaches an instrument for monitoring a physical parameter, either temperature or pressure, utilizing an elastic sensor displaceable as a function of the monitored physical parameter. However, it is capable of only monitoring one parameter at a time. The device requires a belt having characteristics which change along the length thereof. The elastic sensor is responsive to the belt characteristic to produce an output signal which varies as a function of the physical parameter being monitored. Such a device is impractical for most automotive or vehicular usages.

Illustrative of early efforts at monitoring fluid bath temperatures is U.S. Pat. No. 1,815,642 (Zubaty) illustrating a bellows filled with a heat responsive fluid, which bellows is immersed in a fluid bath. A mechanical arm is connected between the bellows and a temperature indicator. As the fluid within the bellows is heated, the bellows is permitted to expand to move the mechanical arm indicating the temperature. There is no teaching or consideration of pressure measurement.

Most vehicle coolant systems are operated at an elevated pressure which permits them to operate at a higher temperature. Generally these coolant systems are provided with relief valves to protect against an over-pressure condition. The converse of higher pressure-higher temperature operation is lower pressure-lower temperature operation, that is, at a lower pressure the coolant will boil and evaporate from the system at a lower temperature. Therefore, it is vital to be forewarned of an under-pressure condition as well as an over-temperature condition in these coolant systems.

The above devices, which require immersion in or communication with a fluid to sense either over temperature or over pressure, do not provide a means for measuring both an over-temperature condition and an under-pressure condition. The under-pressure condition exists when the system fluid pressure is lost from a cooling system such as through a loose radiator cap.

SUMMARY OF THE INVENTION

A pressure-biased, temperature sensor constructed in accordance with the invention includes a housing having a chamber with an open end, a vent port and a fluid port in a closed end, and a flexible diaphragm sealing the open end. A first bellows filled with a heat responsive fluid and second bellows with a passage are positioned in the housing chamber in an aligned relationship so that the second bellows passage communicates with the vent port and the first bellows contacts the flexible diaphragm operator. The housing fluid port communicates between the housing chamber and a fluid system. A signal means circuit is provided with a switch means operable by the flexible diaphragm closing the circuit and energizing the signal means. The diaphragm operator is moved by the first bellows, which expands at an elevated fluid temperature, or by a reduction in fluid pressure causing the second bellows to expand to move the first bellows and diaphragm operator. The sensor provides a low pressure bias to the over temperature alarm.

BRIEF DESCRIPTION OF THE DRAWING

In the Figures of the drawing, like reference numerals identify like components, and in the drawing.

DETAILED DESCRIPTION OF THE INVENTION

Figure 1:
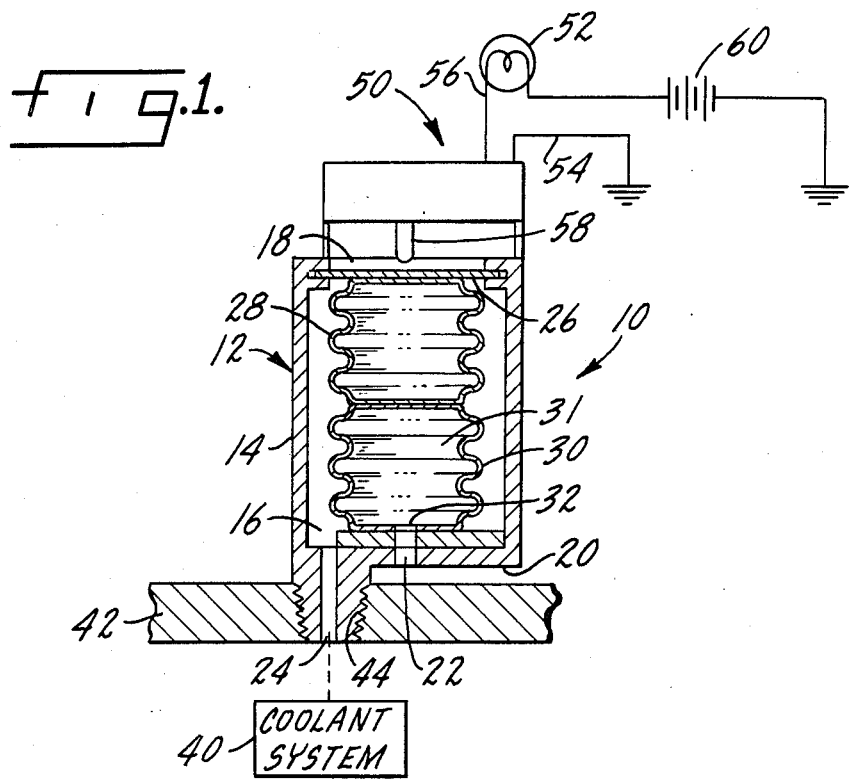
FIG. 1 is a cross-section of a schematic illustration of the pressure-biased, temperature sensor.
Figure 3:
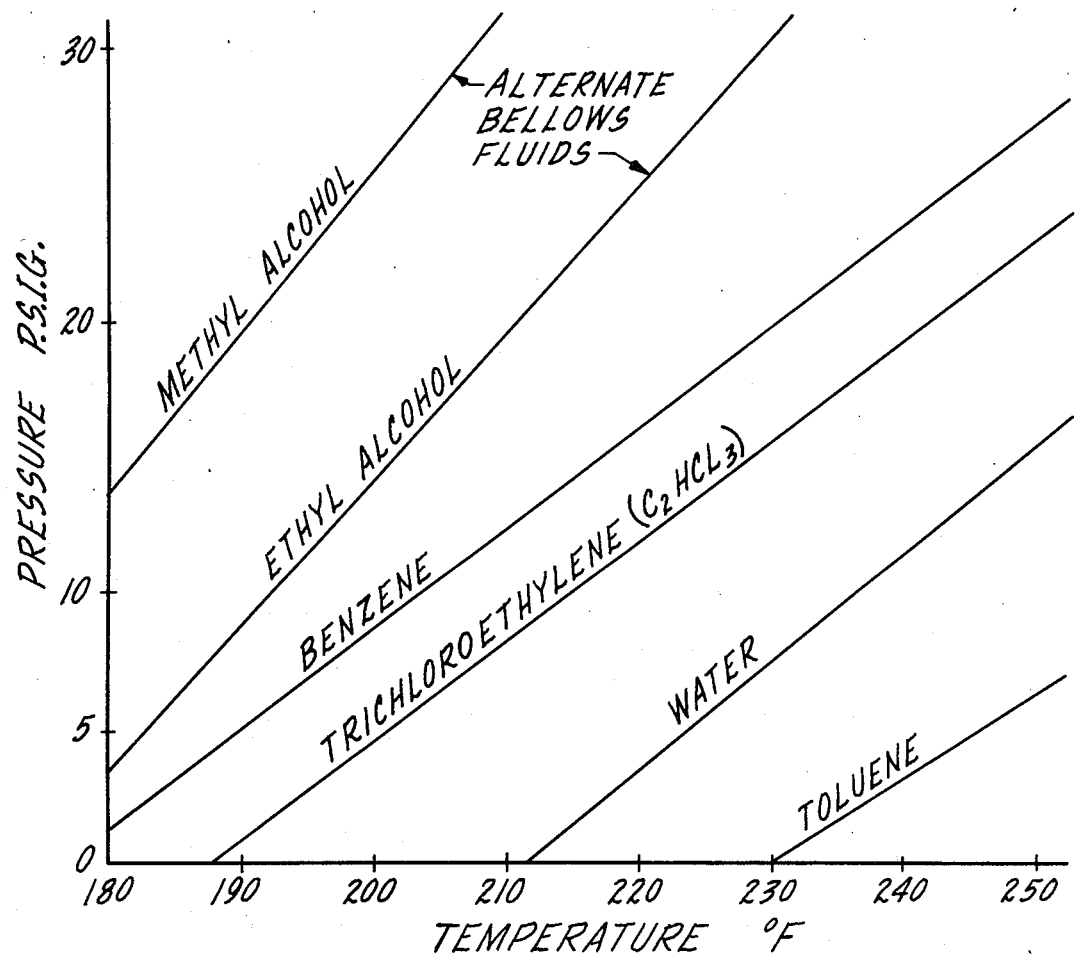
FIG. 3 illustrates a family of vapor pressure-temperature curves for various fluids utilized in sensors.

In FIG. 1 a pressure-biased, temperature sensor 10 is shown in a reference position with a housing 12 having a wall 14 defining a chamber 16 with an open end 18 and a closed end 20. Closed end 20 includes a vent port 22 and a fluid port 24. A flexible diaphragm operator 26, which is positioned in and secured against wall 14 at open end 18, seals chamber 16. A first expandable bellows operator 28 is positioned in chamber 16 to contact flexible diaphragm operator 26, which bellows operator 28 is sealed and contains a temperature responsive fluid therein. A family of pressure-temperature curves for various fluids is illustrated in FIG. 3. Second expandable bellows operator 30 is positioned in chamber 16 between and in contact with the first bellows operator 28 and closed end wall 20 of housing 12. Second bellows operator 30 defines a cavity 31 and a passage 32 which communicates with vent port 22 of housing 12. First bellows operator 28 and second bellows operator 30 are shown aligned along their axes of expansion in FIG. 1.

The pressure-biased, temperature sensor 10 is operable in cooperation with a fluid or coolant system 40 in FIG. 1. A mounting plate 42 separates housing 12 from fluid system 40 and defines a port 44 communicating between fluid system 40 and the outer surface of separating plate 42. The port 44 and fluid port 24 of housing 12 are coupled to provide communication between fluid system 40 and chamber 16 of housing 12.

A signal circuit means 50 includes a signal means 52, a first conductor 54, a second conductor 56 and a switch means 58 operable with sensor 10. First conductor means 54 communicates between switch 58 and ground. Similarly, second conductor means 56 communicates between an opposite terminal of switch 58 and signal means 52 which is connected to a source of energy 60, which is grounded. Switch 58 is a normally open switch operable by flexible diaphragm 26 to close circuit 50. Circuit 50 may be coupled with an energizing means 60.

Figure 2:
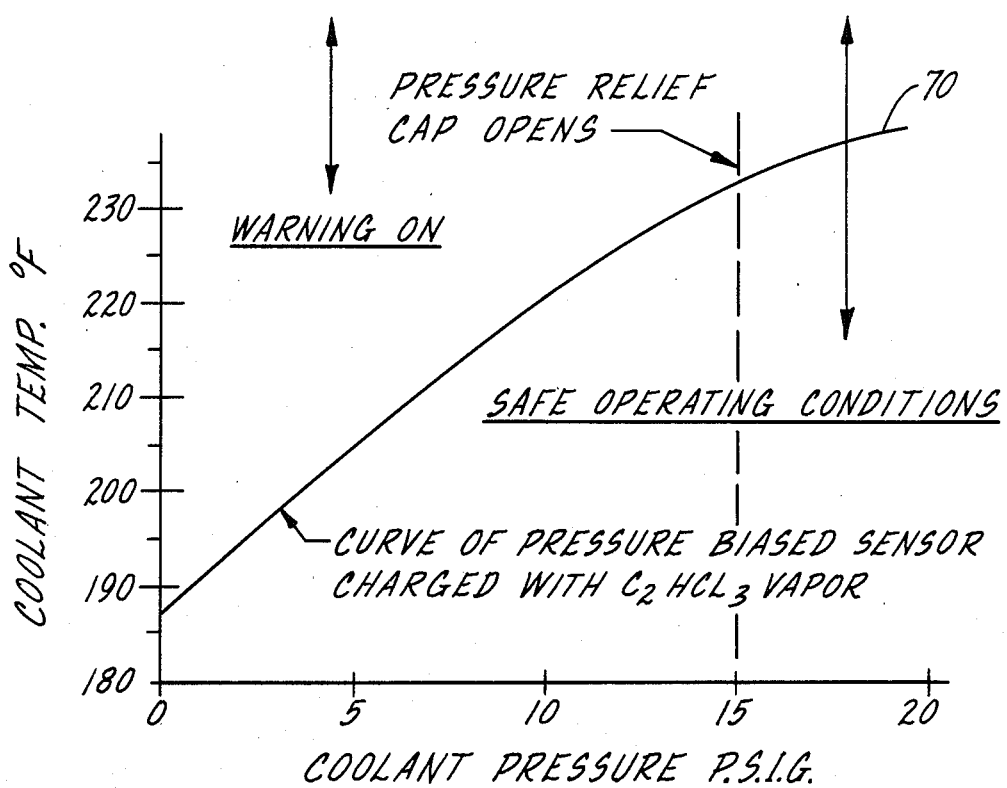
FIG. 2 is a graphical illustration of an operating curve for a pressure-biased, temperature sensor.

In the reference position of FIG. 1, bellows 28 and 30 are at equilibrium. As the temperature of the fluid in fluid system 40 increases, the vapor pressure within chamber 16 increases as does the temperature of the vapor in bellows operator 28. FIGS. 2 and 3 illustrate changes in the vapor temperature and pressure. In FIG. 2, a curve 70 illustrates the change of pressure as a function of temperature for a given vapor fluid and notes an area below the curve termed the "safe operating condition". Below the curve, the bellows 28 and 30 remain contracted to maintain the open circuit of FIG. 1. However, above the curve, in the area noted as "warning on", the vapor expands in bellows 28 and, as long as the coolant remains in the system, bellows 30 does not expand.

In operation, the sensor is sealed, but fluid communicates from fluid means 40 through fluid port 24 to chamber 16. As the temperature of the fluid in fluid system 40 increases, the pressure of such fluid also increases. However, the present sensor provides a means for sensing an under pressure as well as an over temperature condition. The over temperature condition is sensed by first expandable bellows operator 28. As the temperature of the fluid in chamber 16 increases, the fluid within bellows 28 likewise increases and vaporizes. As the temperature of the surrounding fluid continues to increase, the vapor in bellows 28 expands and moves bellows 28 against flexible diaphragm operator 26 to close switch 58 and circuit 50. Closing circuit 50 energizes signal means 52.

A reference pressure is communicated to cavity 31 through passages 32 and vent port 22. In FIG. 1 this reference pressure is atmosphere although any pressure may be selected as such a reference pressure. The liquid coolant in chamber 16 compresses the expansion of bellows operator 30 against the reference pressure.

As the temperature of the fluid increases, the expandable fluid within bellows 28 increases in temperature. However, should the fluid escape from fluid system 40 no fluid pressure would be communicated to chamber 16, although the temperature of the environment would continue to increase. The temperature increase is not rapidly communicated to chamber 16, but an elevated temperature with no associated liquid pressure opposing expansion of bellows 30 would exist in chamber 16. Thus second bellows operator 30 expands against first bellows operator 28 and flexible diaphragm 26 to close switch 58 and complete signal circuit 50 thereby energizing signal means 52. This latter condition is known as an under-pressure condition. That is, the spring force of bellows 30 is greater than the vapor pressure in chamber 16 which allows bellows 30 to expand against first bellows operator 28 and diaphragm 26.

Those skilled in the art will recognize that certain variations can be made in the illustrated embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

I claim:

1. A pressure-biased, temperature sensor means comprising:

a housing defining a chamber having a closed end, an open end and both a fluid port and vent port; said fluid port communicating between said chamber and a fluid system;

a flexible diaphragm operator positoned in and sealing said open end;

a first expandable bellows operator (FEO) filled with a temperature responsive fluid and a second expandable bellows operator (SEO) defining a cavity and a passage connecting with said housing vent port at said closed end to provide a reference pressure to said cavity, said FEO and SEO positoned in said chamber in an aligned relationship with said FEO between said SEO and said flexible diaphragm;

a switch means positioned on said housing and operable by said flexible diaphragm;

a signal circuit having a signal means, a switch means and a source of energy which signal circuit is closed by said switch means to energize said signal means;

the aligned FEO and SEO bellows cooperate to move said flexible diaphragm operator to close said switch means and thereby energize said signal means below a predetermined pressure level or above a predetermined temperature level.

2. A pressure-biased, temperature sensor means as claimed in claim 1, wherein said housing vent port communciates with the atmosphere.

3. A pressure-biased, temperature sensor means as claimed in claim 1, wherein said first and second bellows are metal.

4. A pressure-biased, temperature sensor means as claimed in claim 1, wherein said signal means is a warning lamp.

5. A pressure-biased, temperature sensor for a fluid system comprising:
- a housing defining a chamber, a first port and a second port,
- a first expandable bellows operator (FEO) within said housing and defining a sealed volume filled with a temperature responsive fluid;
- a second expandable bellows operator (SEO) within said housing and defining a fluid passage and a cavity;
- a source of fluid at a reference pressure communicating with one of said chamber of said cavity;
- fluid from said fluid system communicating to the other of said chamber or said cavity;
- a signal circuit having signal means, a switch means and means for providing electrical energy, which signal circuit is closed by said switch means to energize said signal means;
- a switch actuation means operable by said FEO and said SEO; and
- said FEO and SEO in series alignment in said chamber cooperating to move said switch actuation means to close said switch means and said signal circuit when the fluid in said fluid system rises above a predetermined temperature or falls below a predetermined pressure.

* * * * *

UNITED STATES PATENT OFFICE
CERTIFICATE OF CORRECTION

Patent No. 4,663,608　　　　　　　　　Dated May 5, 1987

Inventor(s) ROBERT R. KELLY

It is certified that error appears in the above-identified patent and that said Letters Patent are hereby corrected as shown below:

Column 6, line 2, cancel "of" (second occurrence) and insert -- or --.

Signed and Sealed this

Eleventh Day of August, 1987

Attest:

Attesting Officer

DONALD J. QUIGG

Commissioner of Patents and Trademarks